M. R. WHITE.
STEERING WHEEL LOCK.
APPLICATION FILED OCT. 24, 1921.

1,417,647.

Patented May 30, 1922.
2 SHEETS—SHEET 1.

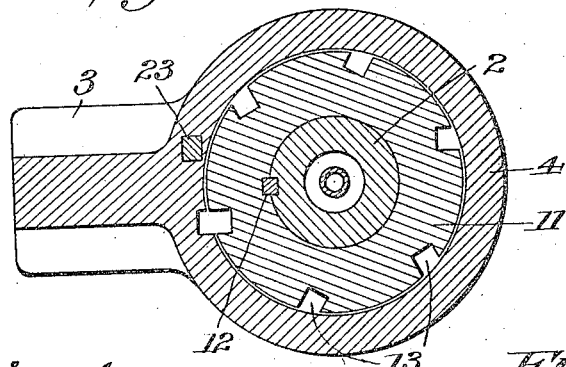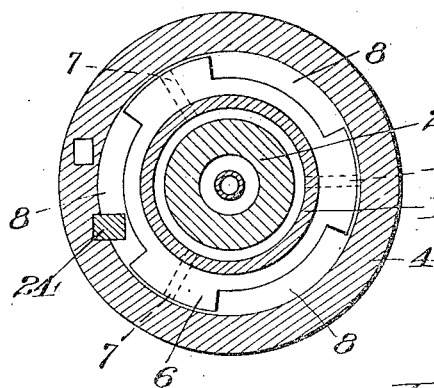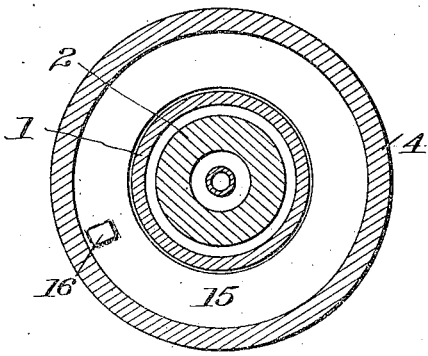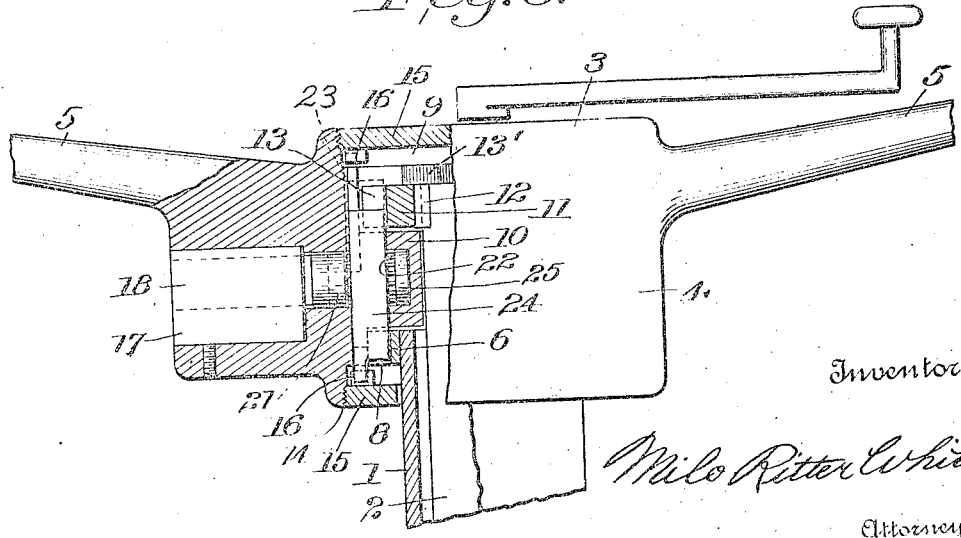

UNITED STATES PATENT OFFICE.

MILO RITTER WHITE, OF WASHINGTON TOWNSHIP, ELKHART COUNTY, INDIANA.

STEERING-WHEEL LOCK.

1,417,647.

Specification of Letters Patent. Patented May 30, 1922.

Application filed October 24, 1921. Serial No. 510,055.

*To all whom it may concern:*

Be it known that I, MILO RITTER WHITE, a citizen of the United States, residing in Washington Township, in the county of Elkhart and State of Indiana, have invented certain new and useful Improvements in Steering-Wheel Locks, of which the following is a specification.

This invention relates to a lock for the steering mechanism of an automobile, whereby the steering wheel may be disconnected from the steering post.

An object of this invention is to provide a lock of such a character that the steering wheel, when disconnected from the post, may be locked to a relatively rigid part of the automobile.

Another object of this invention is to provide a lock mechanism which, in one position operatively connects the steering wheel to the steering post, and which in another position locks the steering wheel to the steering column, the steering post, when the mechanism is in the last named position, being free to be rotated by the manual operation of the road wheels.

Another object of this invention is to provide a lock which prevents the removal of the steering wheel from the steering post.

Another object of this invention is to provide a steering wheel lock which will preclude the operation of the steering mechanism even if the steering wheel is surreptitiously connected to the steering post in any manner.

A still further object of this invention is to provide a lock which will permit the automobile to be moved in case of fire and guided by the manual operation of the road wheels.

Other objects and advantages of this invention will appear upon consideration of the following specification and drawings in which like reference characters are applied to corresponding elements in the various figures.

Fig. 1 is a side elevation partly in section showing the steering wheel locked against rotation.

Figs. 2, 3, 4 and 5 are sectional views taken on lines II—II, III—III, IV—IV and V—V respectively of Fig. 1.

Fig. 6 is a vertical section taken on line VI—VI of Fig. 2.

Fig. 7 is a plan view of the actuating pinion showing a dovetailed groove in one end thereof.

Fig. 8 is a side elevation partly in section showing a modification.

Fig. 9 is a fragmentary sectional view showing the lock of Fig. 1, in unlocked position and the steering wheel hub operatively connected to the steering post.

The steering column or stationary member 1 is adapted to be rigidly connected to a part of the automobile not shown. Within the column there is rotatively mounted the steering post or actuated element 2, which is connected at its lower end in a conventional manner to the front road wheels not shown. The steering wheel or actuating member 3 has a hub portion 4 from which radiate a plurality of spokes 5. The spokes are provided at their free ends with a wheel rim, not shown.

The upper end of the column 1 is provided with a keeper plate 6, which is secured thereto in any suitable manner as by screws 7. The keeper plate 6, which may be formed integrally with the column 1, has a plurality of bolt receiving recesses 8. The wheel hub 4, which has an opening 9 extending from one end thereof to the other, is provided with an annular portion 10 which is adapted to loosely engage the steering post 2 and to abut the keeper plate 6. Overlying the annular portion 10 there is a hub member 11 secured to the post 2 by means of the key 12. The hub member 11 is provided with a plurality of bolt receiving recesses 13 in the periphery thereof. The upper end of the post 1 is provided with threads to receive a nut 13'.

Each end of the hub opening 9 is provided with screw threads 14, which engage with the threaded portions of the closure plates 15. Each closure plate is provided with a projecting lug 16, the function of which will be described later.

The hub 4 is provided with a laterally extending enlargement in which is mounted a pin lock 17 of conventional type, having a cylinder 18, adapted to be rotated upon insertion of the key, not shown. The projecting end of the cylinder 18 has a dove-tailed rib 19 adapted to be received in a dovetailed groove 20 in the pinion 21. It will be obvious that the cylinder 18 and pinion 21 can be separated only by a lateral movement of the one with respect to the other, and such relative movement is precluded, when the lock is assembled, since the projecting end of the cylinder 18 and the pinion 21 are mounted in an opening of substantially the same size and shape. The pinion 21 has intermediate its ends a reduced portion provided with teeth 22. The hub 4 has two reciprocating bolts 23 and 24 slidable in guideways formed therein. These bolts are provided with teeth to mesh with the teeth of pinion 21. In assembling the locking elements in the hub 4, the lock 17 and the pinion 21 are first placed in position after which the bolts 23 and 24 are inserted from the ends of the hub into their respective guideways. When the bolts are in engagement with the teeth 22 of the pinion, the lock and pinion will be retained in position, since the flange 25 of the pinion cannot pass between the bolts.

Referring now to the modification shown in Figures 1 to 6 inclusive and 9, the body portion of the bolt 24 is of a length slightly less than the width of the annular portion 10. In the position shown in Figure 1, the bolt 24 is in engagement with the keeper plate 6 and the reduced portion of the bolt projects into the path of movement of the lug 16, carried by the lower closure plate 15. The bolt 23 is in raised position and extends into the path of movement of the lug 16 on the upper closure plate 15. In this position of the lock the steering mechanism will be inoperative since the wheel is locked to a part rigid to the stationary part 1. It is very important to note that when the lock is in the locked position as shown in Figure 1, the steering post 2 is free to be rotated with respect to both the wheel 3 and the column 1 by the manual operation of the road wheels. If the wheel 3 is connected to the post 1 in any manner as by drilling or wedging the parts together, it will still be impossible to operate the steering mechanism since the wheel 3 is locked to the stationary column 1. The keeper plate 6 is provided with elongated recesses 8 so as to avoid the necessity of moving the wheel 3 to a certain position before the bolt can be moved to locking position which would be the case if the recesses 8 were just large enough to receive the bolt 24. It is also to be noted that when the lock is in locked position as shown in Figs. 1 and 6 that both closure plates are locked against removal with the result that the wheel 3 cannot be removed nor can access be had to the inside of the hub 4.

When it is desired to operate the steering mechanism, the lock cylinder 18 and pinion 21 are rotated by a suitable key. The rotation of the pinion in a counter-clockwise direction as seen in Fig. 6 moves the bolt 24 upward into engagement with the hub member 11, and the bolt 23 downward, thereby releasing the wheel 3 from the column 1 and rigidly connecting it to the post 2 as shown in Fig. 9. In this position of the parts it will be seen that the closure plates 15 may be removed if so desired. When the bolt 24 is moved to a position so that the body portion thereof is within the flange 10, the steering wheel may then be turned to any desired position.

The modification shown in Fig. 8 has the same structure as that shown in Figs. 1–7 and 9 with the exception that the bolt 24 is made long enough to engage both the hub member 11 and the keeper plate 6 at the same time. When this form of the lock is in locking position as shown in Fig. 8, the closure plates 15 are locked against removal, the post 2 is rigidly connected to the wheel 3, and the wheel is permitted to move relative to the column 1 between certain limits predetermined by the extent of the elongated recesses 8. When it is desired to unlock the lock, the barrel 18 and pinion 21 are rotated toward the left, thereby raising the bolt 24 out of engagement with the keeper plate 6 and permitting the normal operation of the steering post.

The lock as shown in Figs. 1–9 inclusive, may be applied to a steering wheel of the Ford type. The keeper plate 6 may be secured to the neck portion of the upper section of the conventional planetary gear casing, the sections of said casing being secured together in any suitable maner. The bolt 24 may be made to engage a recess in the neck position of the upper section of the planetary gear casing.

While I have shown and described the preferred embodiment of my invention, it is of course to be understood that I reserve the right to make such changes in the form, construction and arrangement of parts as will not depart from the spirit of the invention or the scope of the subjoined claims.

What I claim and desire to secure by United States Letters Patent is:

1. In the combination of a steering column, steering post, and steering wheel, lock means carried by said wheel and adapted upon operation thereof to one position to operatively connect said wheel to said post and upon operation thereof to another position to connect said wheel to said column.

2. In the combination of a steering column, steering post, and steering wheel, lock means carried by said wheel, said lock means adapted in one position to lock said wheel to said post and in another position to lock said wheel to said column, said post being free to rotate with respect to said column when the lock means is in the last named position.

3. In the combination of a rigid element, a movable element, and an operating element therefor, lock means carried by said operating element, said means adapted in one position to lock said operating element to said movable element against relative movement, and adapted in another position to lock said operating element to said rigid element, said movable element being movable relative to said operating means and said rigid element when said lock means is in the last mentioned position.

4. In the combination of a steering column, steering post, and steering wheel, said wheel having a hollow hub adapted to receive said post, a closure plate adapted to close an open end of said hub, lock means carried by said wheel, said lock means adapted to connect said wheel to said column and to lock said plate against removal.

5. In the combination of a steering column, steering post, and steering wheel, said wheel having a hub member adapted to receive said post, a keeper plate carried by said column, a closure plate carried by said wheel, lock means carried by said wheel and adapted to lock said closure plate against removal from said hub, and to lock said wheel to said keeper plate.

6. The combination of a steering column, steering post, and steering wheel, a keeper plate carried by said column, a hub member mounted on said post, lock means carried by said wheel and adapted in one position to connect said wheel to said post, in an intermediate position to permit rotation of said wheel relative to said column and post, and in a third position to connect said wheel to said column, said post being free to rotate relative to said column and wheel when said lock means is in the last mentioned position.

7. In the combination of a steering column, steering post, and steering wheel, said wheel having a hub open at each end, a plurality of closure plates adapted to close the ends of said hub, lock means on said wheel adapted to engage said column to connect said wheel thereto, and engage said closure plates to secure the same against removal.

8. In the combination of a steering column, steering post, and steering wheel, a keeper plate mounted on said column and having an elongated keeper recess, a closure plate adapted to be fitted in one end of said wheel, lock means carried on said wheel adapted to lock said closure plate and to engage said recess whereby said wheel is locked against unlimited rotary movement.

9. In the combination of a steering column, steering post, and steering wheel, said wheel having an internal portion, a hub member carried by said post and adapted to over-lie said portion to limit axial movement of said steering wheel in one direction, a closure adapted to close one end of the wheel, lock means on said wheel adapted in one position to engage said hub member and in another position to lock said closure plate against removal.

10. In a steering mechanism, a steering post and steering wheel, a lock bolt mounted in said wheel, lock controlled means to move said bolt to operatively connect said wheel and post, said means having a portion extending within the contour of said bolt to secure the former in position.

11. In the combination of a steering member, steering post and a stationary member, lock means adapted upon operation to connect said steering member to said post, and also adapted upon further operation to connect said steering member to said stationary member.

12. The combination of a steering means, actuated means adapted to be actuated by said steering means, holding means, and locking means for locking said steering means to said actuated means and also for locking said steering means to said holding means to hold said steering means against unlimited movement.

13. The combination of steering means, actuated means, locking means for locking said steering means to said actuated means, and also for locking said steering means against unlimited movement.

14. The combination of steering means, actuated means, locking means adapted in one position to lock said steering means to said actuated means, and in another position to lock said steering means against unlimited movement.

15. The combination of steering means, actuated means, locking means adapted in one position to lock said steering means to said actuated means and in a second position to lock said steering means against unlimited movement and to disconnect the steering means from the actuated means.

In testimony whereof I affix my signature.

MILO RITTER WHITE.